United States Patent
Held

(10) Patent No.: US 11,203,297 B2
(45) Date of Patent: Dec. 21, 2021

(54) HOLDER DEVICE

(71) Applicant: AUDI AG, Ingolstadt (DE)

(72) Inventor: Stefan Held, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 44 days.

(21) Appl. No.: 16/630,186

(22) PCT Filed: Jul. 12, 2018

(86) PCT No.: PCT/EP2018/068863
§ 371 (c)(1),
(2) Date: Jan. 10, 2020

(87) PCT Pub. No.: WO2019/029938
PCT Pub. Date: Feb. 14, 2019

(65) Prior Publication Data
US 2020/0148115 A1    May 14, 2020

(30) Foreign Application Priority Data

Aug. 5, 2017   (DE) ..................... 10 2017 007 379.1

(51) Int. Cl.
*B60R 1/02*        (2006.01)
*B60R 1/04*        (2006.01)
(Continued)

(52) U.S. Cl.
CPC ............... *B60R 1/04* (2013.01); *B60R 11/04* (2013.01); *B60R 2011/005* (2013.01); *B60R 2011/0026* (2013.01)

(58) Field of Classification Search
CPC ... B60R 1/04; B60R 11/04; B60R 2011/0026; B60R 2011/005; B60R 1/025; B60R 1/08
(Continued)

(56) References Cited

U.S. PATENT DOCUMENTS 2,146,859 A * 2/1939 Seklehner .................. B60R 1/04
                                                            248/467
2,968,995 A * 1/1961 Holden .................... A45D 42/14
                                                            248/467
(Continued)

FOREIGN PATENT DOCUMENTS

DE    102016005207 A1    11/2017
DE    102016012673 A1 *   4/2018 ............... B60R 1/04
(Continued)

OTHER PUBLICATIONS

English-language translation of International Preliminary Report on Patentability dated Feb. 20, 2020, in corresponding International Patent Application No. PCT/EP2018/068863; 8 pages.
(Continued)

*Primary Examiner* — Christopher Garft
*Assistant Examiner* — Michael McDuffie
(74) *Attorney, Agent, or Firm* — Maier & Maier, PLLC

(57) ABSTRACT

A holder device for a rear-view and/or display device of a motor vehicle having at least one holder plate fixed to a panel or plate-like object, and having at least one securing foot, which is or can be detachably arranged on the holder plate wherein by at least one retaining means fixed to the securing foot or at least partially surrounding the securing foot, which is or can be fixed to a vehicle component spaced apart from the holder plate, which limits a movement of the securing foot in a state in which it is at least partially detached from the holder plate in form fitting and/or force-locking manner.

10 Claims, 1 Drawing Sheet

Figure 1:
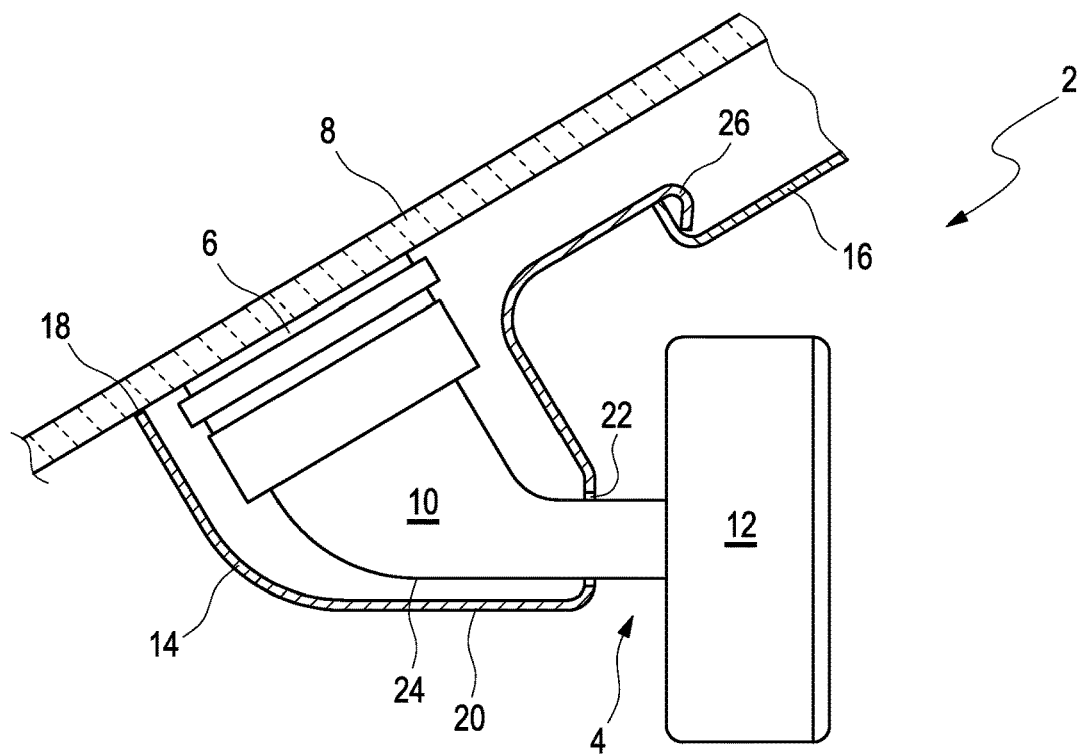

(51) Int. Cl.
*B60R 11/04* (2006.01)
*B60R 11/00* (2006.01)

(58) Field of Classification Search
USPC ..... 348/148; 248/467, 475.1, 476, 479, 489, 248/205.2, 205.3, 205.5, 205.6, 206.5
See application file for complete search history.

(56) References Cited

U.S. PATENT DOCUMENTS

| | | | | |
|---|---|---|---|---|
| 3,131,251 | A * | 4/1964 | Ryan | B60R 1/04 248/467 |
| 3,508,815 | A * | 4/1970 | Julbert | B60R 1/04 359/883 |
| 4,243,196 | A * | 1/1981 | Toda | B60R 1/04 248/475.1 |
| 4,645,316 | A * | 2/1987 | Ohyama | B60R 1/04 248/467 |
| 5,330,149 | A * | 7/1994 | Haan | B60R 1/04 248/475.1 |
| 5,587,236 | A * | 12/1996 | Agrawal | B32B 7/12 428/334 |
| 5,820,097 | A * | 10/1998 | Spooner | B60R 1/04 248/549 |
| 6,042,076 | A * | 3/2000 | Moreno | B60R 1/04 248/222.11 |
| 6,166,698 | A * | 12/2000 | Turnbull | B60C 23/061 343/700 MS |
| 6,202,976 | B1 * | 3/2001 | Johnson | B60R 1/04 248/476 |
| 7,219,867 | B2 * | 5/2007 | Kalis | B60R 11/0258 248/205.5 |
| 8,179,437 | B2 * | 5/2012 | Schofield | H04N 5/23238 348/148 |
| 2004/0079853 | A1 * | 4/2004 | Suzuki | B60R 1/04 248/476 |
| 2008/0231704 | A1 | 9/2008 | Schofield et al. | |
| 2008/0315060 | A1 * | 12/2008 | Muller | B60R 1/04 248/475.1 |
| 2013/0313388 | A1 * | 11/2013 | Diatzikis | B60R 11/02 248/205.6 |
| 2014/0055617 | A1 * | 2/2014 | Minikey, Jr. | F16F 1/32 348/148 |
| 2014/0175250 | A1 * | 6/2014 | Chieppa | B60R 1/04 248/475.1 |

FOREIGN PATENT DOCUMENTS

| | | |
|---|---|---|
| EP | 1078818 A2 | 2/2001 |
| EP | 1707440 A2 | 10/2006 |
| EP | 2474449 A1 | 7/2012 |
| JP | 2003-011723 A | 1/2003 |
| WO | 03/065084 A1 | 8/2003 |

OTHER PUBLICATIONS

German Examination Report dated Mar. 14, 2018 in corresponding German Application No. 10 2017 007 379.1; 20 pages; Machine translation attached.
International Search Report with English translation and Written Opinion with Machine translation dated Sep. 21, 2018 in corresponding International Application No. PCT/EP2018/068863; 18 pages.
Japanese Office Action dated Feb. 9, 2021, in connection with corresponding JP Application No. 2020-506192 (8 pp., including machine-generated English translation).
Office Action dated Apr. 29, 2021 in Korean Application No. 10-2020-7006160; 10 pages including English-language translation.

* cited by examiner

HOLDER DEVICE

The invention relates to a holder device for a rear-view and/or display device of a motor vehicle, having at least one holder plate fixed to a panel or plate-like object, and having at least one securing foot, which is or can be detachably arranged on the holder plate.

A holder device for a rear-view or a display device in a motor vehicle serves for holding the rear-view or a display device in such a way that it can be seen and read as easily as possible by a vehicle passenger, especially the driver of the motor vehicle. A display device may generally be a monitor or a display, for example a navigation device. Typically, a holder device for a rear-view device is arranged in the interior of the motor vehicle in such a way that the driver of the motor vehicle can observe the traffic behind the vehicle. The holder device, for example, may be fastened to a windshield of the motor vehicle.

Such a rear-view device is arranged, for example as an interior mirror, on the inside of the windshield. For this, the holder plate is usually glued on to the glass pane. A securing foot is detachably arranged on the holder plate, for example by a bayonet lock. The display element containing the actual mirror is arranged on the securing foot.

In order to meet legal requirements, a rear-view device or a holder device for a rear-view device in the vehicle interior must be designed such that the rear-view and/or display device is not loosened from its holder, for example during a direct impact by the head of a vehicle passenger. However, in event of a collision of the motor vehicle, the danger exists of the rear-view and/or display device becoming loosened from its holder by an energy impulse, for example by the triggering of an airbag system, and moving freely in the motor vehicle interior and possibly injuring a vehicle passenger.

One problem which an exemplary embodiment of the invention proposes to solve is to propose a holder device for a rear-view and/or display device having a reduced danger of injuring the vehicle passengers.

This problem is solved according to the invention by an aforementioned holder device having at least one retaining means at least partially surrounding the securing foot, which is or can be fixed to a vehicle component spaced apart from the holder plate, and which limits a movement of the securing foot in a state in which it is at least partially detached from the holder plate in form fitting and/or force-locking manner.

Because the retaining means limits a movement of the securing foot in the state at least partially released from the holder plate, there is a reduced danger of the securing foot with display element fixed to the securing foot moving uncontrolled through the vehicle interior. This reduces the danger of injury to vehicle passengers.

The rear-view and/or display device may be, for example, an interior mirror, a side mirror, a monitor or display or the like. It is conceivable for the holder device to comprise at least one display element, which is secured on the securing foot at an end of the securing foot facing away form the holder plate and on which a mirror or a monitor is or can be secured, containing appropriate images of cameras showing the rear-view or side view situation.

The panel or plate-like object may be a front, rear, and/or side window pane of a motor vehicle.

The holder plate may be undetachably secured to the plate-like object, for example by gluing.

Basically, it is conceivable for the display element to be secured rigidly and immovably to the securing foot. Furthermore, it is conceivable for the display element to be movable relative to the securing foot.

The retaining means can basically be fashioned in any desired manner. It has proven to be advantageous when the retaining means comprises a flexible bendable retaining element, such as a cable, band, or wire, and/or the retaining means comprises a shape-stable retaining element.

When the retaining means comprises a flexible bendable retaining element, such as a cable, band, or wire, the retaining means can have a compact and space-saving design. When the retaining means comprises a shape-stable retaining element, it may be designed as a profile or housing, for example.

Basically, it is conceivable for the retaining means to be secured detachably or nondetachably on the securing foot. When the retaining means at least partially surrounds the securing foot, it has proven to be advantageous when the retaining means comprises a fastening section having an opening, through which opening the securing foot extends, and when the securing foot comprises a stop means, having a diameter which is greater than the diameter of the opening of the fastening section of the retaining means.

This makes it possible to arrange the retaining means in the joined state free of contact with the securing foot. In such a case, it has proven to be advantageous when the securing foot comprises the stop means. In event of a releasing of the securing foot from the holder plate, the securing foot has a certain play before the stop means comes to lie against the retaining means and the movement is abruptly limited.

The stop means can be simply and economically realized when the stop means comprises a protrusion and/or a cross section of the securing foot which broadens from the display element toward the holder plate.

Basically, it is conceivable for the retaining means to be fixed solely to the vehicle component. But the stability of the holder device can be increased if the holder device comprises at least one fixing element by which the retaining means is or can be fixed on the panel or plate-like object and/or the holder plate and by at least one hinge-like bearing means by which the retaining means is fixed to the vehicle component.

In this way, it is possible to reduce the forces acting on the vehicle component in normal operation of the motor vehicle, i.e., when the securing foot is secured to the holder plate. Because the retaining means is secured by a hinge-like bearing means to the vehicle component, the retaining means can turn about the axis of rotation of the hinge-like bearing means in the state when the securing foot is at least partially released from the holder plate. In this way, the acting deceleration forces can be reduced and at the same time a movement of the securing foot and the display element in the vehicle interior can be limited to a region not relevant to an injury of the vehicle passenger.

The hinge-like bearing means is preferably arranged at an end of the retaining means facing away from the fastening section.

In one modification of the last mentioned embodiment, it has proven to be advantageous when the fixing element comprises at least one latching means, by which the retaining means can be locked on the holder plate, and/or at least one glue connection by which the retaining means is or can be fixed to the panel or plate-like object and/or the holder plate, and when the hinge-like bearing means releases the retaining means for a rotation movement in the state of the securing foot at least partly detached from the holder plate.

In order to meet the legal requirements, it has proven to be advantageous for the fixing element to have at least one predetermined breaking point.

Advantageously, the predetermined breaking point is designed in such a way that it holds during a normal operation of the motor vehicle, i.e., when the expected acceleration forces occur during the operation of the motor vehicle, and it gives way and breaks when typical impact acceleration forces are exceeded.

Furthermore, in one embodiment of the holder device it is provided that the retaining means comprises a housing-like cover surrounding the holder plate and/or at least the securing foot, especially over its entire circumference.

In this way, an optically pleasing design of the retaining means can be achieved.

The vehicle component may be any desired component of the motor vehicle that is arranged in the interior of the vehicle in the area of the rear-view and/or display device. It has proven to be advantageous for the vehicle component to comprise a wiring duct, an adapter, a camera, a driver assist system and/or the lining of a vehicle roof.

The retaining means may comprise any desired material. It can be manufactured easily and cost effectively when the retaining means comprises a single or multiple-component plastic, a textile and/or a metal, especially a light metal.

Furthermore, mixed forms are conceivable, for example the fastening section is made of a plastic and the rest of the fastening means is connected for example by a band or a metal to the vehicle component.

Further features, details and benefits of the invention will emerge from the enclosed patent claims, the figurative representation and the following description of a preferred embodiment of the holder device.

Figure 2:
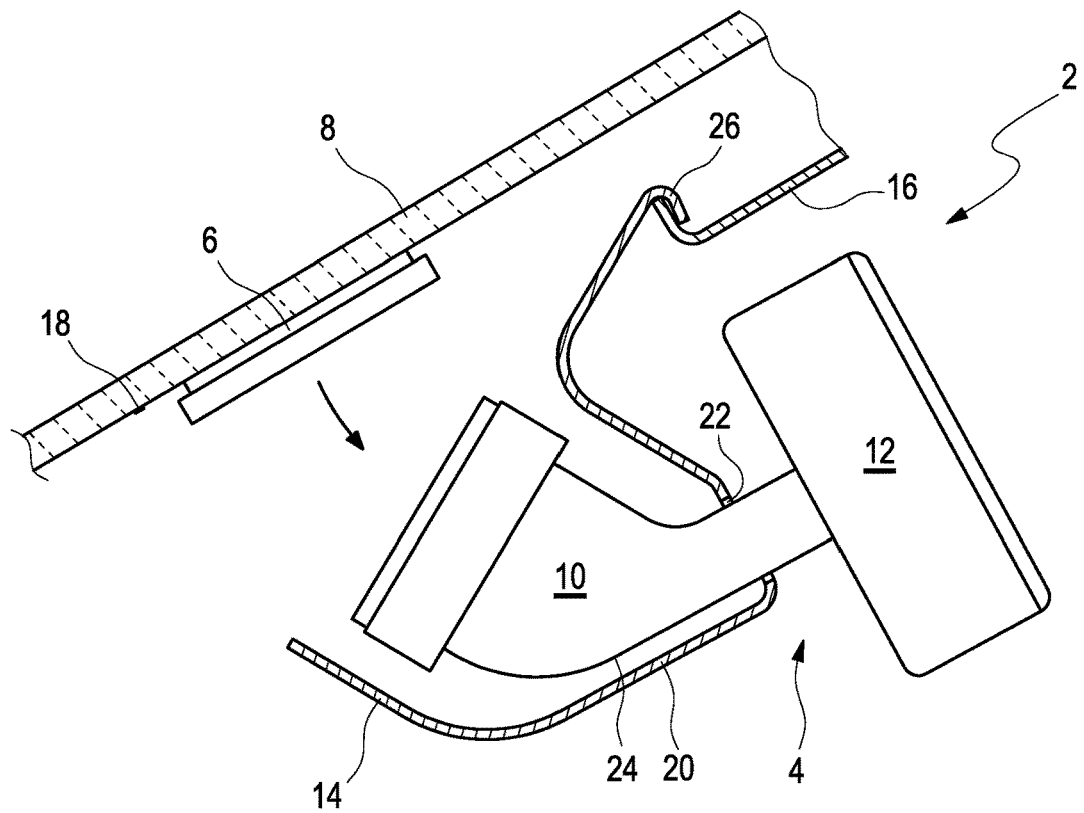

The drawing shows:

FIG. 1 A schematic side view of a holder device in the joined state;

FIG. 2 A schematic side view of the holder device of FIG. 1 in a released state.

FIGS. 1 and 2 show a holder device for a rear-view and/or display device 4 of a motor vehicle (not shown in the figures), designated overall by reference number 2. The holder device 2 comprises a holder plate 6, which is secured to a panel or plate-like object 8. On the holder plate 6 there is releasably mounted a securing foot 10. On the securing foot 10 there is fixed a display element 12 at the end of the securing foot 10 facing away from the holder plate 5.

FIGS. 1 and 2 show an exemplary embodiment of the holder device 2, in which a retaining means 14 is provided, surrounding the securing foot 10, and secured to a vehicle component 16 spaced apart from the holder plate 6. The vehicle component 16 limits a movement of the securing foot 10 in a state at least partly detached from the holder plate 6 (FIG. 2).

FIG. 1 shows the holder device 2 in a joined state. Here, the securing foot 10 is fixed to the holder plate 6 for example by means of a bayonet lock. The retaining means 14 in the exemplary embodiment shown in FIG. 1 is fashioned like a housing. By a fixing element 18 of the holder device 2, the retaining means 14 is secured to the panel or plate-like object 8. The fixing element 18 here may comprise, for example, a glue connection. Furthermore, the retaining means 14 comprises a fastening section 20, having an opening 22. The securing foot 10 extends through the opening 22 of the fastening section 20. The securing foot 10 comprises a stop means 24, having a diameter which is larger than the diameter of the opening 22 of the fastening section 20. In this way, the securing foot 10 can be prevented from sliding out from the retaining means 14. At the end of the retaining means 14 facing away from the fastening section 20, the retaining means 14 comprises a hinge-like bearing means 26. By the hinge-like bearing means 26, the retaining means 14 is secured to the vehicle component 16 in such a way that the retaining means 14 can perform a rotation movement about the bearing means 26. This occurs especially in the state of the securing foot 10 detached from the holder plate 6, as shown in FIG. 2.

FIG. 2 shows the holder device 2 in a state in which the securing foot 10 is detached from the holder plate 6. The fixing element 18 having a predetermined breaking point has also been released, for example as a result of large acceleration forces, so that the securing foot 10, the display element 12 and the retaining means 14 can perform a rotation movement about the hinge-like bearing means 26. This ensures that the individual components of the holder device 2 as well as the rear-view and/or display device 4 fly uncontrolled through the interior of the motor vehicle upon occurrence of large acceleration forces. In this way, the hinge-like bearing means 26 and the retaining means 14 limit the movement of the individual components.

The features of the invention as disclosed in the preceding specification, in the claims and in the drawing may be essential to the implementation of the invention in its various embodiments, either alone or in any desired combination.

LIST OF REFERENCE NUMBERS

2 Holder device
4 Display device
6 Holder plate
8 Plate-like object
10 Securing foot
12 Display element
14 Retaining means
16 Vehicle component
18 Fixing element
20 Fastening section
22 Opening
24 Stop means
26 Hinge-like bearing mean

The invention claimed is:

1. A holder device for a display device of a motor vehicle, comprising: a securing foot coupled to the display device; at least one holder plate fixed to a panel or plate-like object; the securing foot, detachably arranged on the holder plater at least one retaining mechanism fixed to the securing foot or at least partially surrounding the securing foot, which is fixed to a vehicle component spaced apart from the holder plate, and which limits, in a form fitting or force-locking manner, a movement of the securing foot in a state in which it is at least partially detached from the holder plate; and at least one hinge-like bearing means by which the retaining mechanism is pivotably fixed to the vehicle component; wherein, when the securing foot is detached from the holder plate, the securing foot and the retaining mechanism are supported by the vehicle component and rotate about the at least one hinge like bearing means.

2. The holder device according to claim 1, wherein the retaining mechanism comprises one or more of a flexible bendable retaining element and a shape-stable retaining element.

3. The holder device according to claim 1, wherein the retaining mechanism comprises a fastening section having an opening, through which opening the securing foot extends, and the securing foot comprises a stop means, having a diameter which is greater than the diameter of the opening of the fastening section of the retaining mechanism, the stop means being provided on a section of the securing foot that is disposed between the opening and an end of the securing foot that is arranged on the holder plate.

4. The holder device according to claim 3, wherein the stop means comprises one or more of a protrusion and a cross section of the securing foot which broadens from the display device toward the holder plate.

5. The holder device according to claim 1, further comprising:
at least one fixing element by which the retaining mechanism is fixed on the panel, plate-like object, or the holder plate.

6. The holder device according to claim 5, wherein the fixing element comprises one or more of:
at least one latching means, by which the retaining mechanism is detachably fixed to the holder plate; and
at least one glue connection by which the retaining mechanism is be detachably fixed to the panel, plate-like object, or the holder plate.

7. The holder device according to claim 5, wherein the fixing element has at least one predetermined breaking point.

8. The holder device according to claim 1, wherein the retaining mechanism comprises a housing-like cover surrounding one or more of the holder plate and the securing foot.

9. The holder device according to claim 1, wherein the vehicle component comprises one or more of a wiring duct, an adapter, a camera, a driver assist system and the lining of a vehicle roof.

10. The holder device according to claim 1, wherein the retaining means comprises one or more of a single or multiple-component plastic, a textile and a metal.

* * * * *